Aug. 2, 1932.  F. ECKERT  1,870,002
METHOD OF AND APPARATUS FOR PRODUCING SHEET GLASS
Filed April 21, 1928
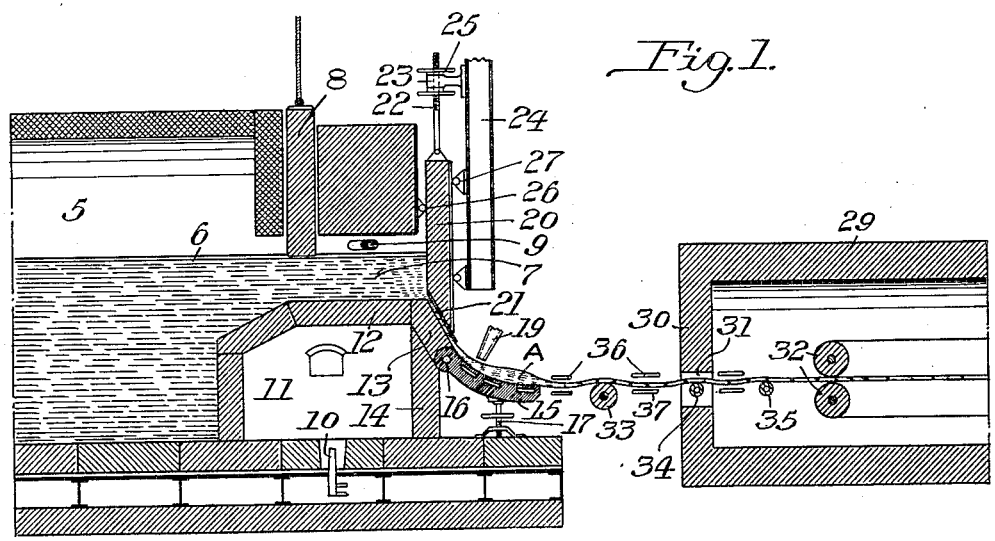
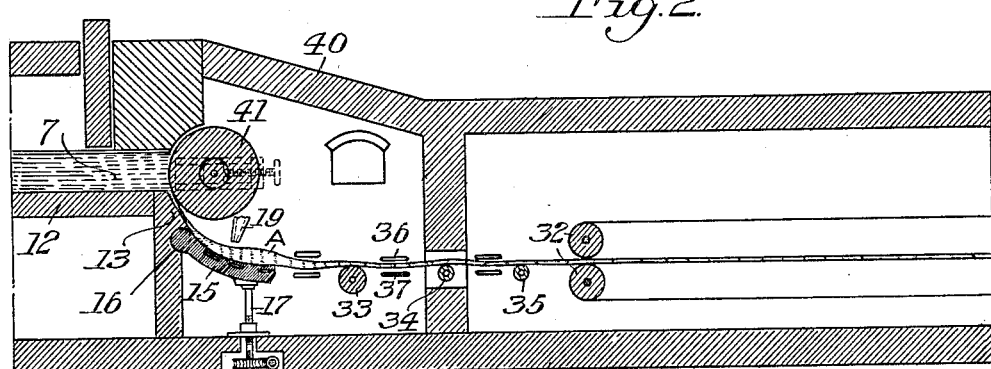
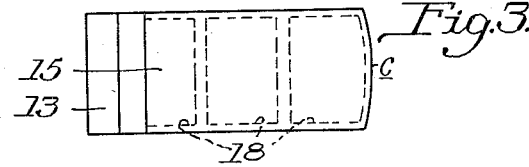
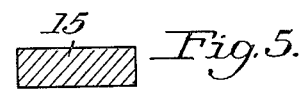
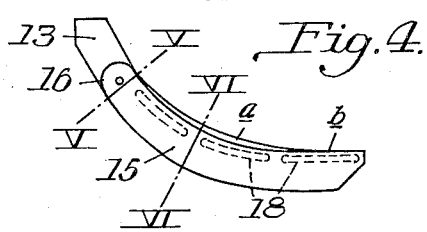
INVENTOR
Fritz Eckert

Patented Aug. 2, 1932

1,870,002

UNITED STATES PATENT OFFICE

FRITZ ECKERT, OF BERLIN, GERMANY, ASSIGNOR OF ONE-FOURTH TO WILLIAM A. MORTON AND ONE-FOURTH TO PAUL L. GEER, BOTH OF PITTSBURGH, PENNSYLVANIA

METHOD OF AND APPARATUS FOR PRODUCING SHEET GLASS

Application filed April 21, 1928, Serial No. 271,948, and in Germany July 9, 1927.

My invention relates to the art of making sheet glass, and the present invention is particularly directed to a new and improved method of and apparatus for forming sheet glass by a continuous operation.

I am aware that numerous methods have heretofore been devised for forming sheet glass embodying the idea of flowing molten glass from a tank or furnace onto an inclined slab or the like, and drawing the glass from the slab to form sheets.

In these methods, it has been the aim to initially flow the molten glass in a mass of the same thickness as the thickness of the finished sheet; in practice, however, due to various causes, it has been impossible to maintain a constant and uniform thickness of flow. Another difficulty of prior methods is the absence of the necessary support for the molten glass at a critical stage, i. e., when changing from the viscous into the solid state.

Among the objects of the present invention are, to provide a simple and efficient method of and apparatus for forming sheet glass that will overcome the difficulties heretofore met with in the making of sheet glass by the continuous process.

My invention contemplates the flowing of glass in a molten state from the forehearth or trough of a furnace in a relatively thin broad stream of glass over a temperature-controlled means or table of such character that the thin flowing stream, before it reaches the discharge end of the table or member, will be interrupted so as to produce a pool or an accumulated mass of glass, and then drawing the sheets from the said pool or accumulated mass.

In the accompanying drawing, which illustrates apparatus for practicing my invention:

Fig. 1 is a vertical longitudinal sectional view showing a portion of a glass melting furnace and the forehearth thereof, in combination with means embodying my invention, and a fragmentary portion of an annealing chamber;

Fig. 2, a view similar to Fig. 1, showing a modified form of apparatus capable of use for practicing my method;

Fig. 3, a detail top plan of a temperature-controlled table of a preferred form;

Fig. 4, a detail side view of the table or inclined slab shown by Fig. 3;

Figs. 5 and 6, sectional views taken on line V—V and line VI—VI respectively of Fig. 4.

In the form of the apparatus illustrated in Fig. 1, 5 designates a furnace containing molten glass, indicated by the numeral 6. 7 is the forehearth of the furnace, and 8 designates a gate that may be utilized for stopping the flow of molten glass from the furnace proper into the forehearth. As illustrated, the forehearth portion of the furnace is heated by means of burners 9 and 10, the burners 9 being located above the molten glass in the forehearth and the burners 10 located at the bottom of the oven space 11.

Formed as a continuation of the horizontal bottom portion 12 of the forehearth, I provide an inclined table or slab portion 13 having its lower edge supported by a laterally extending wall 14. In addition to this fixed portion 13, the table includes an adjustable slab or table portion 15 which constitutes an important and characteristic feature of my invention, in that it provides simple and convenient means for retarding or interrupting the flow of the thin wide stream of glass in its passage over the table for the purpose of forming an accumulated mass or pool of glass from which the sheets of glass may be drawn, as more fully hereinafter described.

In the present embodiment of my apparatus, as illustrated by Fig. 1, I form the fixed portion 13 of the table of some suitable highly refractory material, while the movable portion 15 is formed of a specially hard metal, as, for example, of a suitable alloy steel. As illustrated, the upper inner end of part 15 is hingedly connected with the lower outer end of part 13, as indicated by the numeral 16; the lower end of the movable portion of the table is adjustably supported on a suitable means 17 for raising and lowering the said movable table portion. As a means for regulating the temperature of portion 15, I provide a series of channels 18 extending transversely through said member, and these channels may be employed for passing a cooling medium therethrough or a heating medium. Likewise, I provide means 19 located above and about midway of the movable table part 15 for supplying a cooling or a heating medium to the downwardly passing stream of glass.

The detail views, Figs. 3 to 6 inclusive, show the preferred form of the part 15 and, as shown, it will be seen that I provide a crowned or arched surface *a* which will produce a widening and stretching of the glass stream, as this curvature causes the glass to flow in a manner to accomplish this end. Attention is also called to the fact that the member 15 has a substantially horizontal glass contacting surface indicated by the character *b*. This surface *b* extends from the inclined portion of member 15 to its take-off edge. The take-off edge of the table may have a curvature as shown by *c*, this curvature being effective to permit a very desirable draw, in view of the fact that the center of the glass mass has a higher temperature and is of greater thickness than the outer edges and, therefore, requires more mechanical support at the center, a support effective to act on the sheet center until the center reaches temperature equilibrium corresponding to any transverse section leaving the take-off edge of the table.

Positioned over the inclined fixed portion 13 of the table and mounted for vertical movement relatively thereto is a gate-like member 20. Member 20 extends throughout the width of portion 13 and cooperates with its upper surface for forming a slot or passage 21, through which slot the molten stream of glass flows from the forehearth. Member 20 is suspended by means of a threaded supporting rod 22 having its lower end connected with member 20, said rod being extended upwardly through a bracket 23 carried on an upright 24.

25 designates a wheel for turning the rod to raise and lower it through the bracket. Roller contacts 26 and 27 may be provided on the forehearth and the upright 24 respectively for guiding member 20. It will be understood that the size or cross sectional area of the passage 21 may be varied by moving the lower end of member 20 towards or away from the inclined portion 13.

Located at a preferred distance from the discharge end of the table, is an annealing leer 29. This leer may be of any desired construction adapted for annealing glass sheets. As shown, the leer includes a front wall 30 having an opening 31 for the passage of glass sheets drawn from the accumulated glass mass on the table. The draw of the sheets from the said mass may be effected by means of a pair of rollers 32 positioned within the leer. Interposed between the rollers 32 and the discharge end of the table, I preferably provide rolls 33, 34 and 35 for supporting the sheet glass. 36 and 37 designate means that may be employed for conveying temperature control mediums, either a heating medium or a cooling medium, to suitable points adjacent the glass for maintaining it at the desired temperature during its travel into the leer.

In the form of apparatus shown by Fig. 2, I have shown the annealing leer connected with the forehearth by a housing structure 40, in which the table and other operating parts are located. In this form of apparatus, designed for practicing my method of forming sheet glass, I substitute for the gate member 20 a slowly revolving temperature-controlled cylinder 41, otherwise the apparatus is substantially similar to the form of Fig. 1, and the corresponding parts have been given the same reference characters as in the form of Fig. 1. Cylinder 41 constitutes the upper wall of the passage 21 and, like member 20, it extends throughout the width of the structure and is positioned relatively to the fixed portion 13 of the table in the same manner as member 20.

As above described, my method contemplates the formation of a pool or an accumulated mass of glass, from which the sheets are drawn. This pool or mass is indicated at A. The production or the formation of this glass mass A is effected by subjecting the glass stream to a desired temperature and by mechanical means, such for example, as by the employment of the adjustable table having the configuration shown, or other mechanical means upon which the thin stream of glass as it flows is interrupted.

It will be understood that the thickness of the glass mass A is greater than the thickness of the flowing stream of glass before it is retarded; that, by reason of the crowned or convex surface of the table, the thin flowing stream is properly shaped; and, further, that as the sheets are drawn from the mass A, they immediately assume their final or finished thickness and shape. In following my method of making sheet glass, the advantages obtained by hand working methods are also obtained; for example, providing for the proper support of the semi-formed glass or providing the necessary mechanical strength to the mass, said mass, in effect, providing an upper and a lower surface for support, which will yield uniformly while drawing the sheets from the mechanically supported glass mass to final thickness.

I claim:

1. The method of forming sheet glass which consists in flowing molten glass in a relatively thin stream from a molten mass of glass and interrupting the flow to form an accumulated mass of glass while the glass is continuously supported, and drawing the glass beyond the support and from the accumulated mass for stretching the glass into final sheet form beyond the support.

2. The method of forming sheet glass which consists in flowing molten glass over a support continuous from one end to the other end in a relatively thin stream from a molten mass of glass, cooling the flowing glass while on said support, interrupting the flow to form an accumulated mass on said support, and then drawing the glass beyond the support and in substantially a horizontal direction from the said accumulated mass for stretching the glass into final sheet form beyond the support.

3. The method of forming sheet glass which consists in flowing molten glass in a relatively thin stream from a molten mass of glass down a support extending downwardly and forwardly and continuous from end to end, cooling the flowing glass on the support, interrupting the flow to form an accumulated mass on the support, and then drawing the glass from the said accumulated mass in a substantially horizontal direction for stretching the glass into final sheet form beyond the support.

4. The method of forming sheet glass which consists in flowing molten glass in a relatively thin stream from a molten mass of glass onto a support continuous from end to end having a convex temperature controlled surface, interrupting the flow of glass on the support to form an accumulated mass of glass, and drawing the glass from the accumulated mass in a substantially horizontal direction beyond the support for stretching the glass into final sheet form beyond the support.

5. The method of forming sheet glass which comprises flowing the glass in a thin sheet at high temperature, exposing the thin sheet to a cooling agent, accumulating a mass of the pre-cooled glass, the under surface of the thin sheet of glass being in continuous contact and the glass continuously supported from the commencement of flow to the accumulation of said mass, and in drawing glass from the mass beyond the support therefor to form the sheet by stretching the glass to ultimate form at a point beyond the support.

6. The method of forming sheet glass which comprises flowing the glass in attenuated form on a support while its under surface is in continuous contact therewith, accumulating the glass at a lower temperature on a portion of the same support which is adjustable to control the size of the accumulating mass, and then drawing the glass from the accumulated mass and stretching the same for producing the ultimate sheet beyond said support.

7. Apparatus for forming sheet glass comprising a support for a flowing stream of glass, means for supplying molten glass to the support, said support having a portion generally concave in the direction of the flow of glass to form an accumulated mass of glass, said support providing continuous contact means for the under surface of the flowing stream, and means for drawing glass from the said mass to form the sheet by stretching the glass to ultimate form beyond the support.

8. Apparatus for forming sheet glass comprising a support positioned for continuous contact with the under surface of a flowing stream of glass, means for supplying molten glass to the support, said support having a portion generally concave in the direction of the flow of glass, to form an accumulated mass of glass, means for adjusting the position of said portion to control the size of the mass, and means for drawing glass from the said mass and stretching the same to form the final sheet beyond the support.

9. A supporting device for the flow of glass thereover, the device being transversely cambered for the purpose specified, said device at the discharge end having a portion extending forwardly beyond the side edges and intermediate the same.

10. A supporting device for the flow of glass thereover, said device at the forward end bulging forwardly intermediate the sides, for the purpose specified.

11. A supporting device for the flow of glass thereover, said device being generally concave in the direction of flow, said device being cambered transversely and extending forwardly at the discharge end, between and beyond the side edges.

12. The method of forming sheet glass which consists in flowing molten glass in a relatively thin stream from a molten mass of glass, interrupting the flow to form an accumulated mass of glass while the glass is continuously supported, and drawing glass from the accumulated mass to form the sheet by stretching the glass to ultimate form at a point beyond the support.

13. The method of forming sheet glass which comprises flowing molten glass in attenuated form directly from a molten glass mass and directly over a continuous support while maintaining the glass in continuous contact therewith, cooling the flowing glass while on the support, interrupting the flow to form an accumulated mass on the support, and then drawing glass from the accumulated mass and effecting stretching thereof beyond the support to form the final sheet beyond the support.

In testimony whereof I affix my signature.

Dr. FRITZ ECKERT.